US012681192B2

(12) United States Patent (10) Patent No.: US 12,681,192 B2
Ozawa et al. (45) Date of Patent: Jul. 14, 2026

(54) INFORMATION PROCESSING DEVICE, PROGRAM, AND POSITIONING METHOD

(71) Applicant: ULTIMATRUST CO., LTD., Tokyo (JP)

(72) Inventors: Iwao Ozawa, Tokyo (JP); Futoshi Iinuma, Tokyo (JP)

(73) Assignee: ULTIMATRUST CO., LTD., Tokyo (JP)

( * ) Notice: Subject to any disclaimer, the term of this patent is extended or adjusted under 35 U.S.C. 154(b) by 348 days.

(21) Appl. No.: 18/292,699

(22) PCT Filed: Jul. 27, 2021

(86) PCT No.: PCT/JP2021/027757
§ 371 (c)(1),
(2) Date: Oct. 4, 2024

(87) PCT Pub. No.: WO2023/007588
PCT Pub. Date: Feb. 2, 2023

(65) Prior Publication Data
US 2025/0035796 A1 Jan. 30, 2025

(51) Int. Cl.
*G01S 19/45* (2010.01)
(52) U.S. Cl.
CPC ................................... *G01S 19/45* (2013.01)
(58) Field of Classification Search
CPC .......... G01S 19/45; G01S 19/41; G01S 19/51; G08G 1/146; G08G 1/04; G01C 21/005; G01C 11/04
See application file for complete search history.

(56) References Cited

U.S. PATENT DOCUMENTS 5,867,804 A * 2/1999 Pilley ..................... G08G 5/727
342/36
6,405,132 B1 * 6/2002 Breed .................... G08G 1/161
701/45
(Continued)

FOREIGN PATENT DOCUMENTS

CN 107018362 A 8/2017
EP 0574009 A2 12/1993
(Continued)

OTHER PUBLICATIONS

Japan Patent Office/ISA, International Search Report and Written Opinion for PCT Application No. PCT/JP2021/027757, mail date Oct. 19, 2021.
(Continued)

*Primary Examiner* — Richard M Camby
(74) *Attorney, Agent, or Firm* — SoCal IP Law Group LLP; Mark Andrew Goldstein

(57) ABSTRACT

The present invention accurately identifies the position of a moving object, such as an automobile. An information processing device comprises: a reference position acquisition unit which acquires reference position information indicating the position of an image capturing device; and a position inference unit which, on the basis of first position information indicating the current position of the image capturing device as calculated based on a satellite positioning signal and second position information indicating the current position of the moving object moving in the surroundings of the image capturing device based on a satellite positioning signal temporally synchronised with the positioning signal for the first position information, acquires relative position information indicating a positional relationship between the image capturing device and the moving object, and outputs inferred position information indicating (Continued)

the current position of the moving object based on the relative position information and the reference position information.

10 Claims, 9 Drawing Sheets

(56) References Cited

U.S. PATENT DOCUMENTS

| | | | |
|---|---|---|---|
| 6,865,484 B2 | 3/2005 | Miyasaka et al. | |
| 8,368,589 B2 | 2/2013 | Wirola et al. | |
| 8,442,766 B2 * | 5/2013 | Nielsen | G06Q 10/06 |
| | | | 324/67 |
| 8,548,649 B2 * | 10/2013 | Guyette | G01S 19/14 |
| | | | 701/3 |
| 8,649,930 B2 * | 2/2014 | Reeve | B62D 1/02 |
| | | | 701/472 |
| 9,880,562 B2 * | 1/2018 | Webber | G01S 19/53 |
| 2005/0060069 A1 * | 3/2005 | Breed | B60W 30/04 |
| | | | 701/408 |
| 2005/0134440 A1 * | 6/2005 | Breed | B60N 2/2863 |
| | | | 701/45 |
| 2007/0208507 A1 | 9/2007 | Gotoh | |
| 2008/0040029 A1 * | 2/2008 | Breed | G01W 1/00 |
| | | | 701/514 |
| 2011/0254978 A1 | 10/2011 | Yamaji | |
| 2012/0162436 A1 * | 6/2012 | Cordell | H04N 21/23109 |
| | | | 348/158 |
| 2015/0073705 A1 | 3/2015 | Hiwatashi | |

FOREIGN PATENT DOCUMENTS

| | | | |
|---|---|---|---|
| JP | 2007-232690 A | 9/2007 | |
| JP | 2008-306464 A | 12/2008 | |
| JP | 2015-052548 A | 3/2015 | |
| JP | 2016-169974 A | 9/2016 | |
| JP | 2020-129130 A | 8/2020 | |
| JP | 6821768 B2 | 1/2021 | |
| KR | 101444685 B1 | 9/2014 | |
| WO | 2011071948 A2 | 6/2011 | |
| WO | 2014/020949 A1 | 2/2014 | |
| WO | 2023007588 A1 | 2/2023 | |

OTHER PUBLICATIONS

European Patent Office, Extended European Search Report for EP Patent Application No. 21951798.4, issued Jul. 31, 2024.

* cited by examiner

Figure 6:
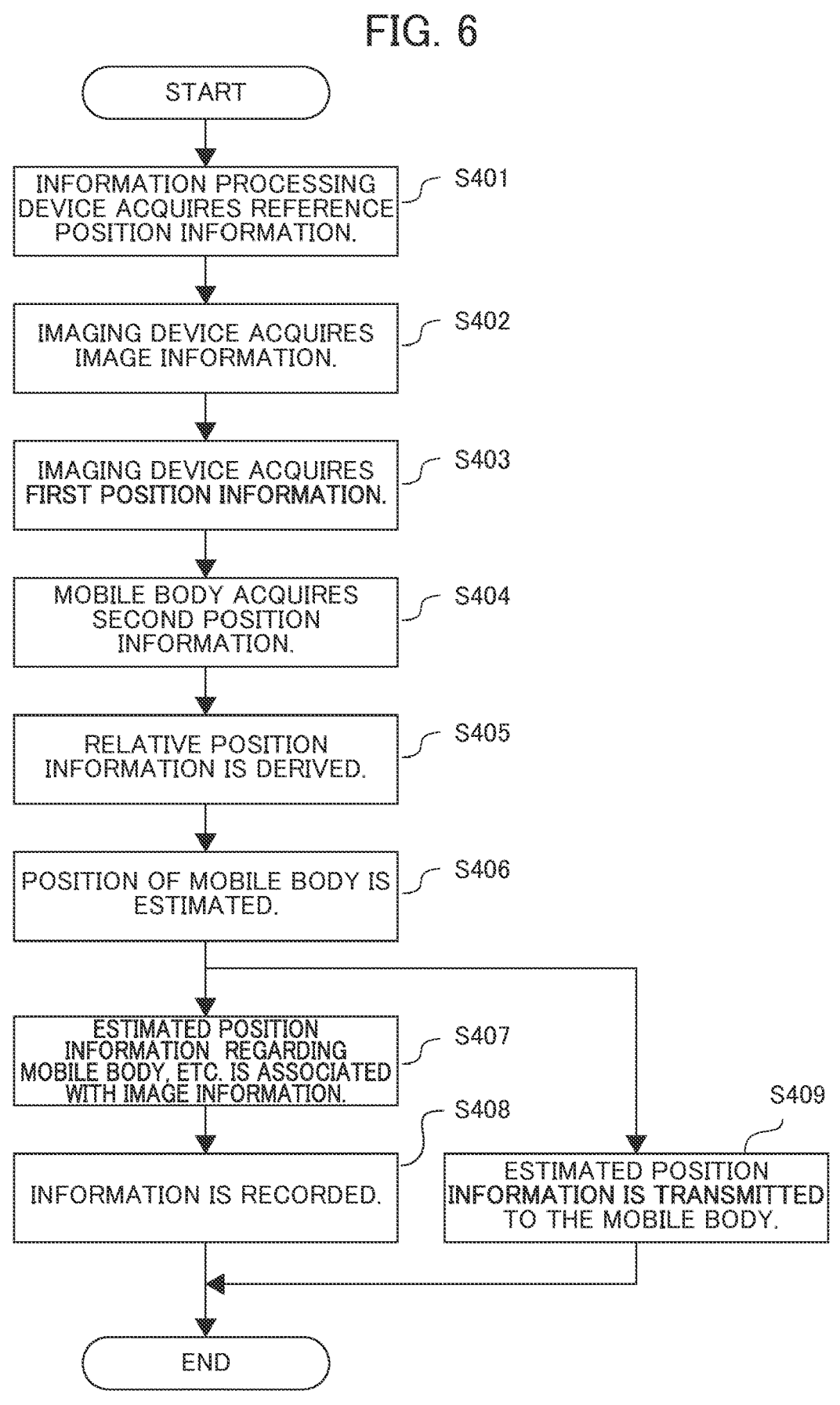

START

INFORMATION PROCESSING
DEVICE ACQUIRES REFERENCE
POSITION INFORMATION.
S401

IMAGING DEVICE ACQUIRES
IMAGE INFORMATION.
S402

IMAGING DEVICE ACQUIRES
FIRST POSITION INFORMATION.
S403

MOBILE BODY ACQUIRES
SECOND POSITION
INFORMATION.
S404

RELATIVE POSITION
INFORMATION IS DERIVED.
S405

POSITION OF MOBILE BODY IS
ESTIMATED.
S406

ESTIMATED POSITION
INFORMATION REGARDING
MOBILE BODY, ETC. IS ASSOCIATED
WITH IMAGE INFORMATION.
S407

INFORMATION IS RECORDED.
S408

ESTIMATED POSITION
INFORMATION IS TRANSMITTED
TO THE MOBILE BODY.
S409

END

INFORMATION PROCESSING DEVICE, PROGRAM, AND POSITIONING METHOD

RELATED APPLICATION INFORMATION

This patent claims priority from International PCT Patent Application No. PCT/JP2021/027757, filed Jul. 21, 2021 entitled, "INFORMATION PROCESSING DEVICE, PROGRAM, AND POSITIONING METHOD", which is incorporated herein by reference in its entirety.

NOTICE OF COPYRIGHTS AND TRADE DRESS

TECHNICAL FIELD

The present invention relates to an information processing device, a program, and a positioning method.

BACKGROUND

Conventionally, there has been a method of acquiring position information regarding a mobile body by receiving a global navigation satellite system signal (hereinafter, referred to as a Global Navigation Satellite System (GNSS) signal) from a positioning satellite. The positioning based on only a GNSS signal achieves positioning accuracy in meters. For this reason, real time kinematic-GNSS (RTK-GNSS) positioning method is used as one of means for increasing the positioning accuracy. According to this method, a ground reference point whose position is measured with high positioning accuracy is used to correct position information acquired from a GNSS signal by the mobile body. The RTK-GNSS positioning method achieves position accuracy in centimeters. For example, Patent Document 1 discloses this type of technology.

Patent Document 1: Japanese Patent No. 6821768

Problems to be Solved by the Invention

An RTK-compatible GNSS receiver needs to perform complex processing in real time, which requires large computing capability. As a result, the receiver may be large, heavy, and expensive.

SUMMARY

The present invention has been made to overcome the above-described disadvantage, and it is an object of the present invention to accurately identify a position of a mobile body such as an automobile.

Means for Solving the Problems

To achieve the above object, an aspect of the present invention is directed to an information processing device including: a reference position acquisition unit configured to acquire reference position information indicating a position of an imaging device; and a position estimation unit configured to acquire relative position information indicating a positional relationship between the imaging device and a mobile body that moves in a vicinity of the imaging device, based on first position information and second position information, and output mobile body position information indicating a current position of the mobile body, based on the relative position information and the reference position information, the first position information indicating a current position of the imaging device calculated based on a positioning signal transmitted from a satellite, the second position information indicating a current position of the mobile body based on a positioning signal transmitted from a satellite and synchronized in terms of clock time with the positioning signal on which the first position information is based.

Effects of the Invention

The present invention makes it possible to accurately identify the position of the mobile body such as an automobile. For example, in a situation where the imaging device such as a surveillance camera is installed, the position of the mobile body such as an automobile can be accurately identified using the reference position information regarding the imaging device.

BRIEF DESCRIPTION OF THE DRAWINGS

FIG. 2 is a block diagram illustrating a hardware configuration of an information processing device according to an embodiment of the present invention;

FIG. 6 is a flowchart illustrating a flow of processing for identifying position information and associating the position information with image information, according to an embodiment of the present invention;

DETAILED DESCRIPTION

Embodiments of the present invention will be described below with reference to the drawings.

Figure 1:
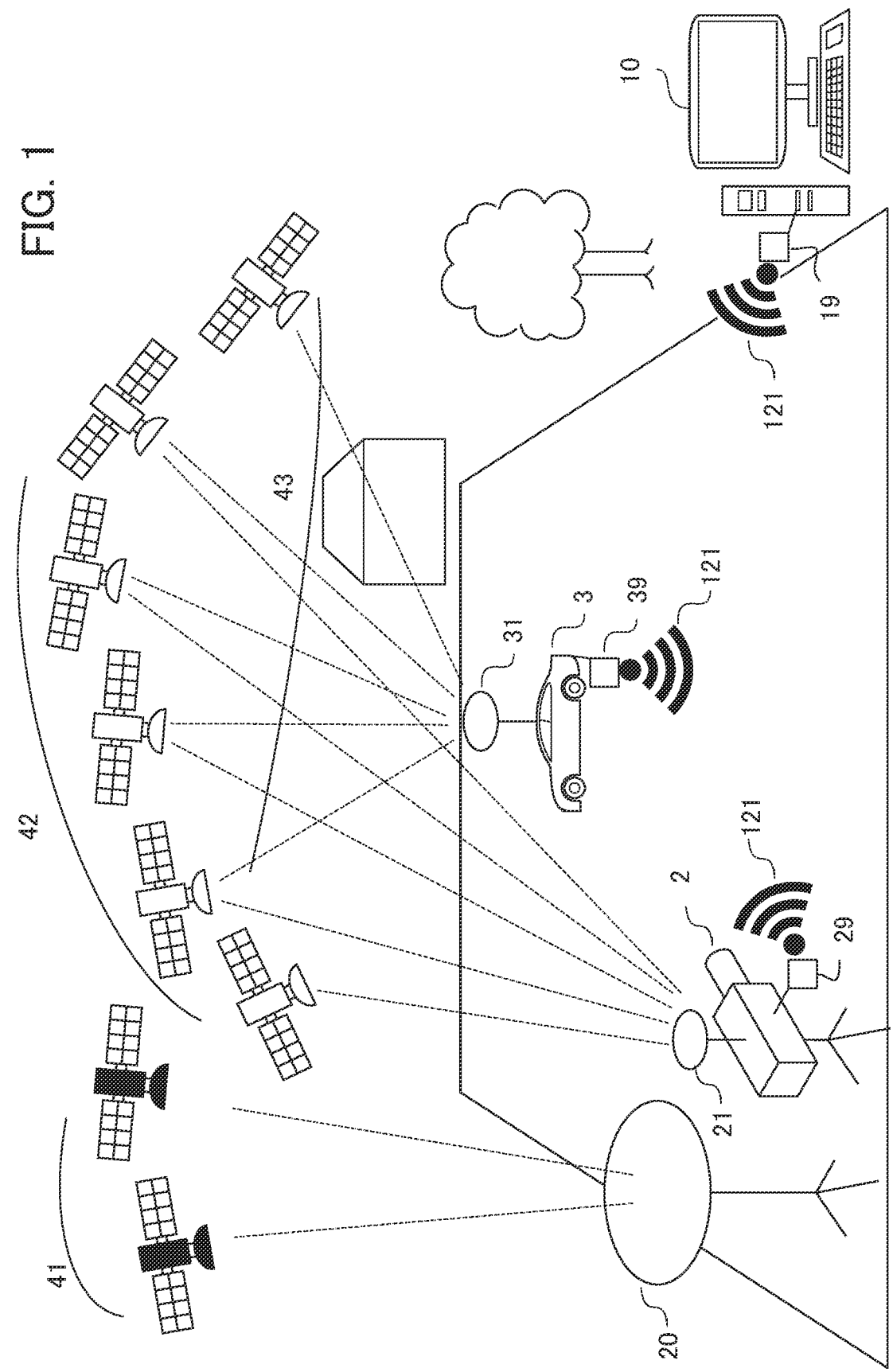
FIG. 1 is a schematic diagram illustrating an imaging device, a mobile body, the information processing device, and positioning satellites according to an embodiment of the present invention.

As illustrated in FIG. 1, an information processing device 10 according to the present embodiment exchanges electronic information between an imaging device 2 and a mobile body 3 or the like that moves in the vicinity of the imaging device 2. The information processing device 10 includes an information processing device-communication device 19, the imaging device 2 includes an imaging device-communication device 29, and the mobile body 3 includes a mobile body-communication device 39, as appropriate. The electronic information is exchanged mainly via a communication line 121. In this example, the communication line 121 is implemented by wireless communication. The communication line 121 is not limited to the wireless communication. For example, the communication line 121 may be implemented by wired communication.

In the following, reference position information 200, first position information 210, and second position information 310 are acquired as position information. The reference position information 200 indicates an accurately-measured position of the imaging device 2. The first position information 210 indicates a current position of the imaging device 2 measured based on a GNSS signal indicating a position of the imaging device 2, and the positioning accuracy achieved based on the first position information 210 alone is lower than the positioning accuracy achieved based on the reference position information 200. The second position information 310 indicates a current position of the mobile body 3 measured based on a GNSS signal indicating a position of the mobile body 3, and a positioning accuracy achieved based on the second position information 310 alone is lower than the positioning accuracy achieved based on the reference position information 200. The first position information 210 and the second position information 310 are acquired based on positioning signals transmitted from satellites and synchronized in terms of clock time. Here, being synchronized in terms of clock time means, but is not limited to, a state in which the clock times perfectly coincide with each other. It means that a clock time at which the first position information is acquired and a clock time at which the second position information is acquired can be associated with each other. In a more limited sense, an example of being synchronized in terms of clock time is that a difference in a clock time of acquisition is within the clock time of acquisition which the GNSS radio wave reception statuses at the clock time of acquisition of the first position information can cancel the GNSS radio wave reception statuses at the clock time of acquisition of the second position information.

The reference position information 200 regarding the imaging device 2 is acquired by a reference-position-intended antenna 20 receiving a positioning signal from a reference-position-intended satellite 41. A reference-position-intended satellite positioning signal reception unit 401

(not shown) receives an electric signal from the reference-position-intended antenna 20, and a reference position measurement-calculation unit 402 (not shown in FIG. 1) calculates and derives the reference position information 200. The first position information 210 regarding the imaging device 2 is acquired by a first-position-intended antenna 21 included in the imaging device 2 receiving a positioning signal from first-position-intended satellites 42. A first-position-intended satellite positioning signal reception unit 403 (not shown in FIG. 1) receives an electric signal from the first-position-intended antenna 21, and a first position measurement-calculation unit 404 (not shown) calculates and derives the first position information.

The mobile body 3 includes a second-position-intended antenna 31. The second-position-intended antenna 31 receives a positioning signal from second-position-intended satellites 43. A second-position-intended satellite positioning signal reception unit 405 (not shown) receives an electric signal from the second-position-intended antenna 31, and a second position measurement-calculation unit 406 (not shown) calculates and derives the second position information 310.

Four satellites are required for calculating position coordinates by first-position-intended satellites 42 and second-position-intended satellites 43. This is because the position coordinates and time are variables. In the example illustrated in FIG. 1, a set of five satellites is applied as the first-position-intended satellites 42 and a set of five satellites is applied as the second-position-intended satellites 43, and the sets include four satellites in common.

As will be detailed later, the information processing device 10 identifies the position of the mobile body 3 based on the reference position information 200, the first position information 210, and the second position information 310.

Figure 2:
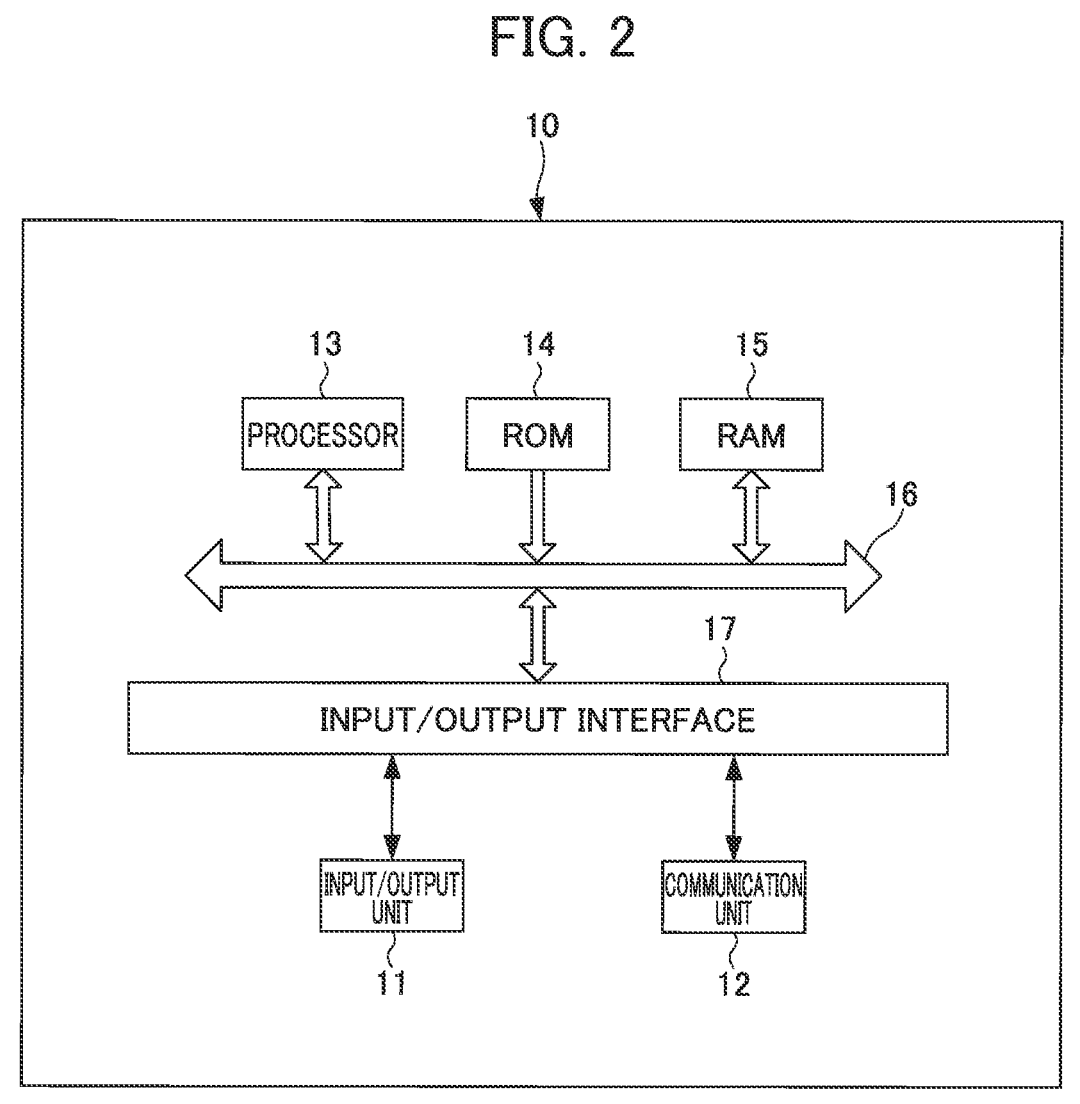

As illustrated in FIG. 2, the information processing device 10 includes a processor 13, a read only memory (ROM) 14, a random access memory (RAM) 15, an input/output unit 11, a communication unit 12, and an input/output interface 17.

The processor 13 performs various calculations and processing. The processor 13 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 13 is a combination of two or more of the foregoing. The processor 13 may be a combination of one or more of the foregoing and a hardware accelerator or the like.

The processor 13, the ROM 14, and the RAM 15 are connected to each other via a bus 16. The processor 13 executes various processing in accordance with a program recorded in the ROM 14 or a program loaded to the RAM 15. A part or the entirety of the program may be incorporated in the circuitry of the processor 13.

The bus 16 is also connected to the input/output interface 17. The input/output interface 17 is connected to the input/output unit 11 and the communication unit 12.

The input/output unit 11 is electrically connected to the input/output interface 17 via wire or wirelessly. The input/output unit 11 includes, for example, an input unit such as a keyboard and a mouse, and an output unit such as a display for displaying an image and a speaker for emitting sound. The input/output unit 11 may have a configuration in which a display function and an input function are integrated, such as a touch panel.

The communication unit 12 is a device that allows the processor 13 to communicate with other devices (e.g., the imaging device 2 and the mobile body 3) via the communication line 121.

The hardware configuration described herein is a non-limiting example, and is not intended to limit the present invention. Instead of the functional components implemented by a processing device alone, such as a single processor, a multiprocessor, a multicore processor, or the like, a combination of one or more of these various processing devices and a processing circuit such as an application specific integrated circuit (ASIC) or a field-programmable gate array (FPGA) may be adopted as a processor to implement the functional components.

Figure 3:
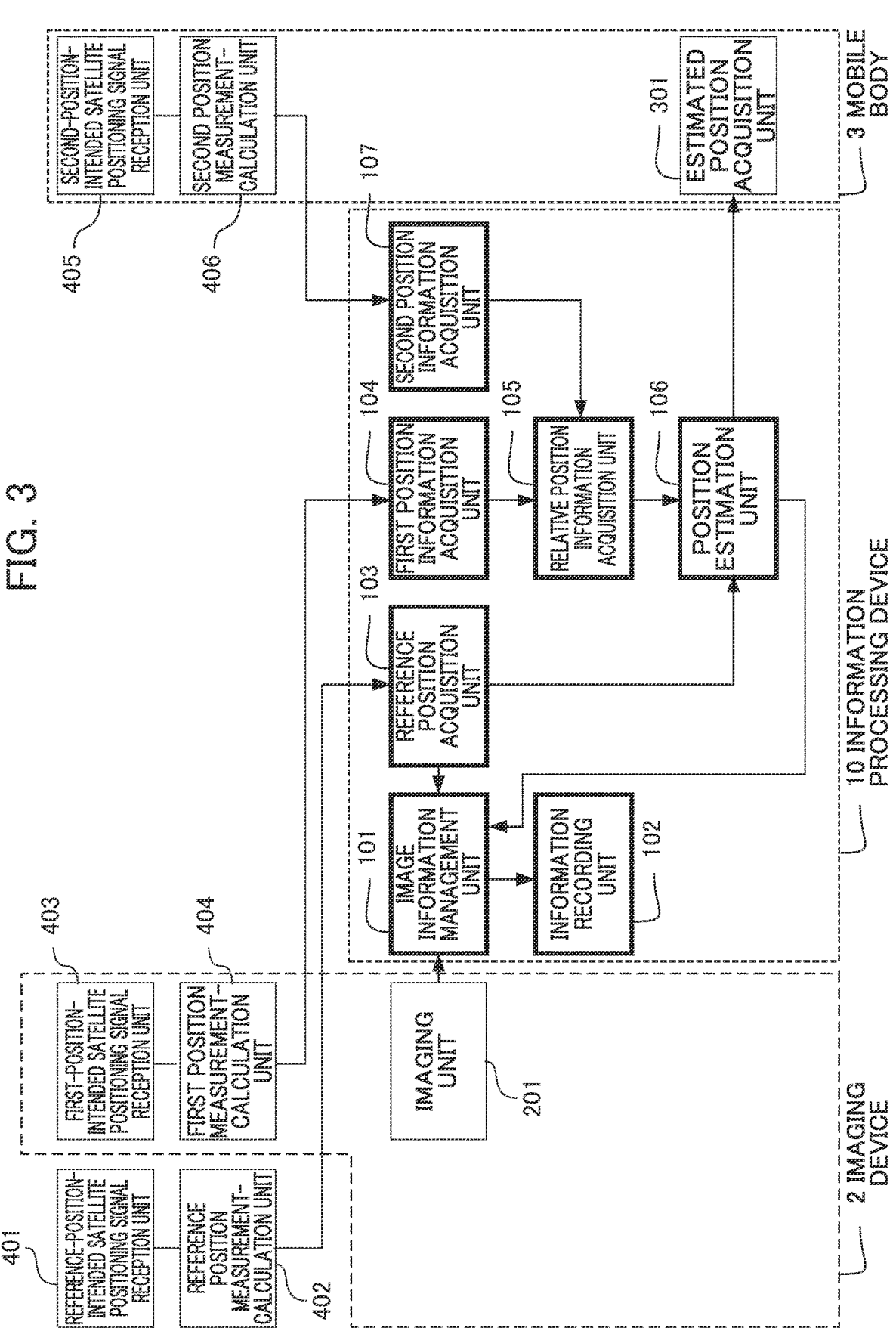
FIG. 3 is a block diagram illustrating functional components of an imaging device, those of the information processing device, and those of a mobile body according to an embodiment of the present invention.

FIG. 3 illustrates functional components of the information processing device 10 and those of the imaging device 2, the mobile body 3, etc. with which the information processing device 10 exchanges signals, according to the present embodiment. The functional components of the information processing device 10 are implemented by the processor 13. The functional components of the imaging device 2 are implemented by an electronic component or a processor of an information processing device such as a computer, which is provided to the imaging device 2. Likewise, the functional components of the mobile body 3 are implemented by an electronic component or an information processing device such as a computer, which is provided to the mobile body 3.

Here, the information processing device 10 is separate from the imaging device 2 and the mobile body 3, and the functional components of the information processing device 10 are all included in a server 1. As will be detailed later, the information processing device 10 may be configured such that a part thereof is incorporated in the imaging device 2 and the mobile body 3. The functional components will be described with reference to FIGS. 1 and 2 as appropriate.

The reference-position-intended satellite positioning signal reception unit 401 receives a satellite signal in order to measure the reference position of the imaging device 2. The reference position measurement-calculation unit 402 receives a signal from the reference-position-intended satellite positioning signal reception unit 401 and calculates the reference position of the imaging device 2. Here, as the reference-position-intended satellite 41, for example, a satellite that provides an accurate position, such as a quasi-zenith satellite, is selected, and an accurate position is provided as the reference position. Typically, the reference-position-intended antenna 20 for receiving a radio wave from the reference-position-intended satellite 41 is relatively large. Accordingly, the reference-position-intended antenna 20 is preferably detached after the position is measured. It is preferable that a measurement device including the reference-position-intended antenna 20, a reference position acquisition unit 103, and the like is detachably connected to the imaging device 2. With this configuration, after the reference position is measured, the reference-position-intended antenna 20 and the reference position acquisition unit 103 can be detached from the imaging device 2.

Instead of using the quasi-zenith satellite, the reference position of the imaging device 2 may be identified by means of position coordinates specified based on a map on which the installation location of the imaging device 2 is plotted.

The position of the imaging device 2 may be derived by, in addition to the positioning based on the reference-position-intended satellite 41, a positioning system similar to a positioning system that can be provided in the mobile body 3. In the present specification, the current position of the imaging device 2 is referred to as a first position. The system similar to the positioning system that can be provided in the mobile body 3 includes the first-position-intended antenna 21, the first-position-intended satellite positioning signal reception unit 403, and the first position measurement-calculation unit 404. The first-position-intended satellite positioning signal reception unit 403 receives a positioning signal by means of the first-position-intended antenna 21, and the first position measurement-calculation unit 404 calculates the first position of the imaging device 2. The first-position-intended satellite positioning signal reception unit 403 and the first position measurement-calculation unit 404 are preferably provided in the imaging device 2.

The reference position of the imaging device 2 may be acquired by long-time positioning or static positioning using the first-position-intended antenna 21, the first-position-intended satellite positioning signal reception unit 403, and the first position measurement-calculation unit 404.

The imaging device 2 includes an imaging unit 201, and captures images of the mobile body 3 and the like that move in, for example, a parking lot.

The information processing device 10 includes an image information management unit 101, an information recording unit 102, a reference position acquisition unit 103, a first position information acquisition unit 104, a relative position information acquisition unit 105, a position estimation unit 106, and a second position information acquisition unit 107.

For convenience of description, the functional components included in the mobile body 3 will be described first. The mobile body 3 is an automobile that moves in a parking lot, for example. In the present specification, a current position of the mobile body 3 is referred to as a second position. The mobile body 3 includes the second-position-intended antenna 31 as illustrated in FIG. 1, and further includes the second-position-intended satellite positioning signal reception unit 405, the second position measurement-calculation unit 406, and an estimated position acquisition unit 301, as illustrated in FIG. 3.

The second-position-intended satellite positioning signal reception unit 405 receives a positioning signal by means of the second-position-intended antenna 31, and the second position measurement-calculation unit 406 calculates the second position. The estimated position acquisition unit 301 acquires an estimated position from the position estimation unit 106 included in the information processing device 10, which will be described later.

Functions of the functional components included in the information processing device 10 will be described with reference to FIG. 3. Since the description will follow a signal flow, the position of the functional components will be described in the up-to-down, down-to-up, left-to-right, and right-to-left directions in FIG. 3. The reference position acquisition unit 103 acquires the reference position calculated by the reference position measurement-calculation unit 402. The first position information acquisition unit 104 acquires the first position information 210 calculated and derived by the first position measurement-calculation unit 404. The second position information acquisition unit 107 acquires the second position information 310 derived by the second position measurement-calculation unit 406 included in the mobile body 3. The relative position information acquisition unit 105 derives a relative position between the first position of the imaging device 2 and the second position of the mobile body 3 based on the information from the first position information acquisition unit 104 and the information from the second position information acquisition unit 107.

Here, for deriving the relative position, it is preferable that the first-position-intended satellite positioning signal reception unit 403 and the second-position-intended satellite positioning signal reception unit 405 receive respective signals from the same satellite. A relative positional relationship between two points is obtained by measuring a difference between points in time at which the radio wave signals from the satellites reach the reception units. Since radio waves are received at observation points and then emitted from the same satellite travel under the same or similar weather condition, a position error pertaining to the satellite and included in the observation values and an amount of delay due to the troposphere and the ionosphere are eliminated by taking the difference between the observation values obtained at two points. Thus, an accurate relative position is obtained.

Alternatively, the first position information 210 and the second position information 310 are derived based on positioning signals from the satellites. A difference between these positions or a distance indicating the difference is acquired as relative position information 230. Adding the relative position information 230 to the reference position information 200 allows for estimation of the position of the mobile body 3.

The position estimation unit 106 acquires the reference position from the reference position acquisition unit 103, and acquires the relative position from the relative position information acquisition unit 105. The relative position is added to the reference position, thereby deriving an accurate position of the mobile body 3. The position of the mobile body 3 derived by the position estimation unit 106 is transmitted to the estimated position acquisition unit 301 and the image information management unit 101.

The image information management unit 101 receives the reference position from the reference position acquisition unit 103, a video from the imaging unit 201 included in the imaging device 2, and the estimated position of the mobile body 3 from the position estimation unit 106. Then, the reference position information 200 is added to an image 240 captured by the imaging device 2, or mobile body position information is added to an image showing the mobile body 3. This information is recorded in the information recording unit 102.

Figure 4:
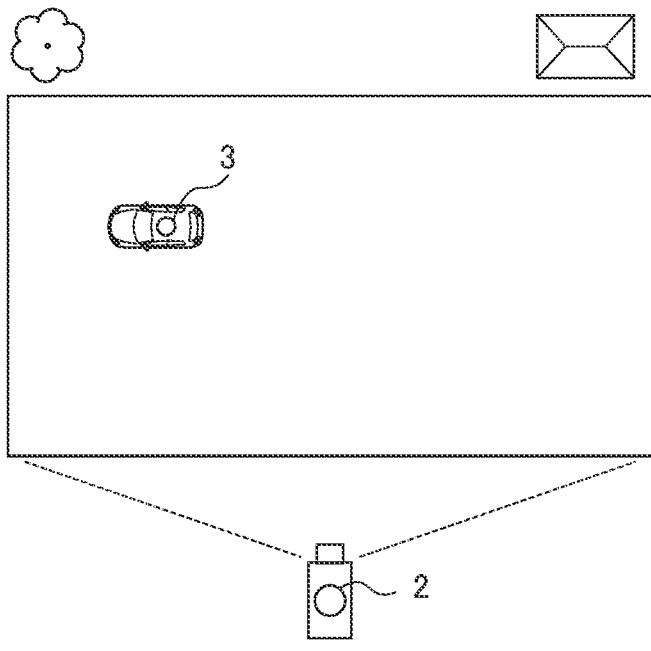
FIG. 4 is a schematic plan view illustrating a relationship between an imaging device and a mobile body according to an embodiment of the present invention.
Figure 5:
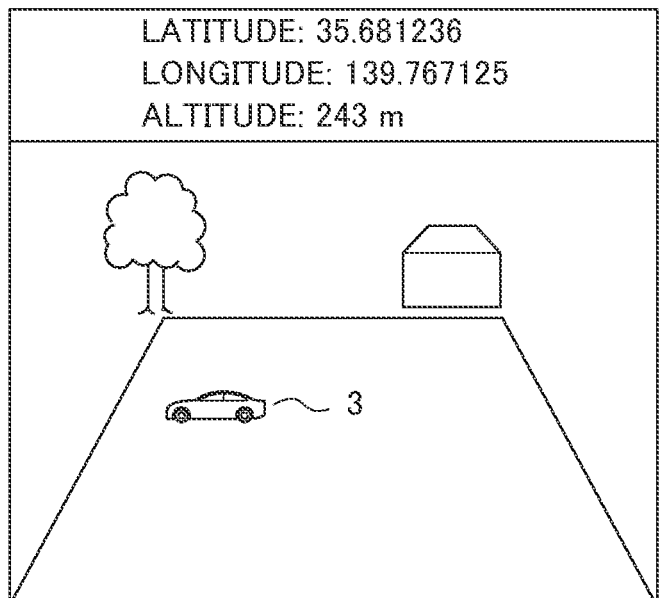
FIG. 5 illustrates an example of a video generated by superimposing position information on a video captured by an imaging device according to an embodiment of the present invention.

FIG. 4 is a plan view showing the mobile body 3 moving in a parking lot and the imaging device 2. FIG. 5 shows an example of the image 240 captured by the imaging device 2. In FIG. 5, the latitude, longitude, and altitude that indicate the reference position of the imaging device 2 are additionally shown on the screen.

FIG. 6 illustrates a flow of processing that is performed by the functional components. Upon start of the processing, the information processing device 10 acquires the reference position information 200 (Step S401). Next, the imaging device 2 acquires image information (Step S402). The imaging device 2 further acquires the first position information 210 regarding the imaging device 2 (Step S403). On the other hand, the mobile body 3 acquires the second position information 310, which is the position information regarding the mobile body 3 (Step S404). Next, the relative position information 230 between the imaging device 2 and the mobile body 3 is derived (Step S405). Based on the reference position information 200 and the relative position information 230, the position of the mobile body 3 is estimated or the estimated position information 320 regarding the mobile body 3 is derived (Step S406). Next, the estimated position information 320 regarding the mobile body 3 or/and the reference position information 200 is/are associated with the image information (Step S407), and the information is recorded (Step S408). In parallel, the estimated position information 320 is transmitted to the mobile body 3 (Step S409). In a case where tracking of the mobile body 3 is to be continued, the process returns to Step S402. In a case where the tracking is to be discontinued, the processing ends (END).

In FIG. 6, the reference position information 200 is acquired prior to acquisition of the first position information 210 regarding the imaging device 2. This is a non-limiting example, and the order may be reversed. Furthermore, the reference position information 200 may be acquired after acquisition of the relative position information 230 between the imaging device 2 and the mobile body 3.

In the foregoing description, the information processing device 10 is independently incorporated in the server 1. This is a non-limiting example, and the entire information processing device 10 may be incorporated in the imaging device 2 or the mobile body 3. For example, in the case where the entire information processing device 10 is incorporated in the imaging device 2, an advantage is provided that it is only necessary, in terms of hardware, to connect the imaging device 2 and the mobile body 3 via the communication line 121, an example of which is Wi-Fi. In the case where the entire information processing device 10 is incorporated in the mobile body 3, the mobile body 3 constitutes a closed system having a computing function, thereby making it possible to prevent a situation in which the communication line 121 becomes poorly connected to the information processing device 10 due to bad weather or the like and the position of the mobile body 3 cannot be identified.

A configuration in which only a part or the entirety of the information processing device 10 is incorporated in the imaging device 2 or/and the mobile body 3 is also effective. FIGS. 7 to 10 illustrate such examples. Similarly to the information processing device 10 illustrated in FIG. 3, the functional components of the information processing device 10 are represented by blocks defined with thick frame lines.

Figure 7:
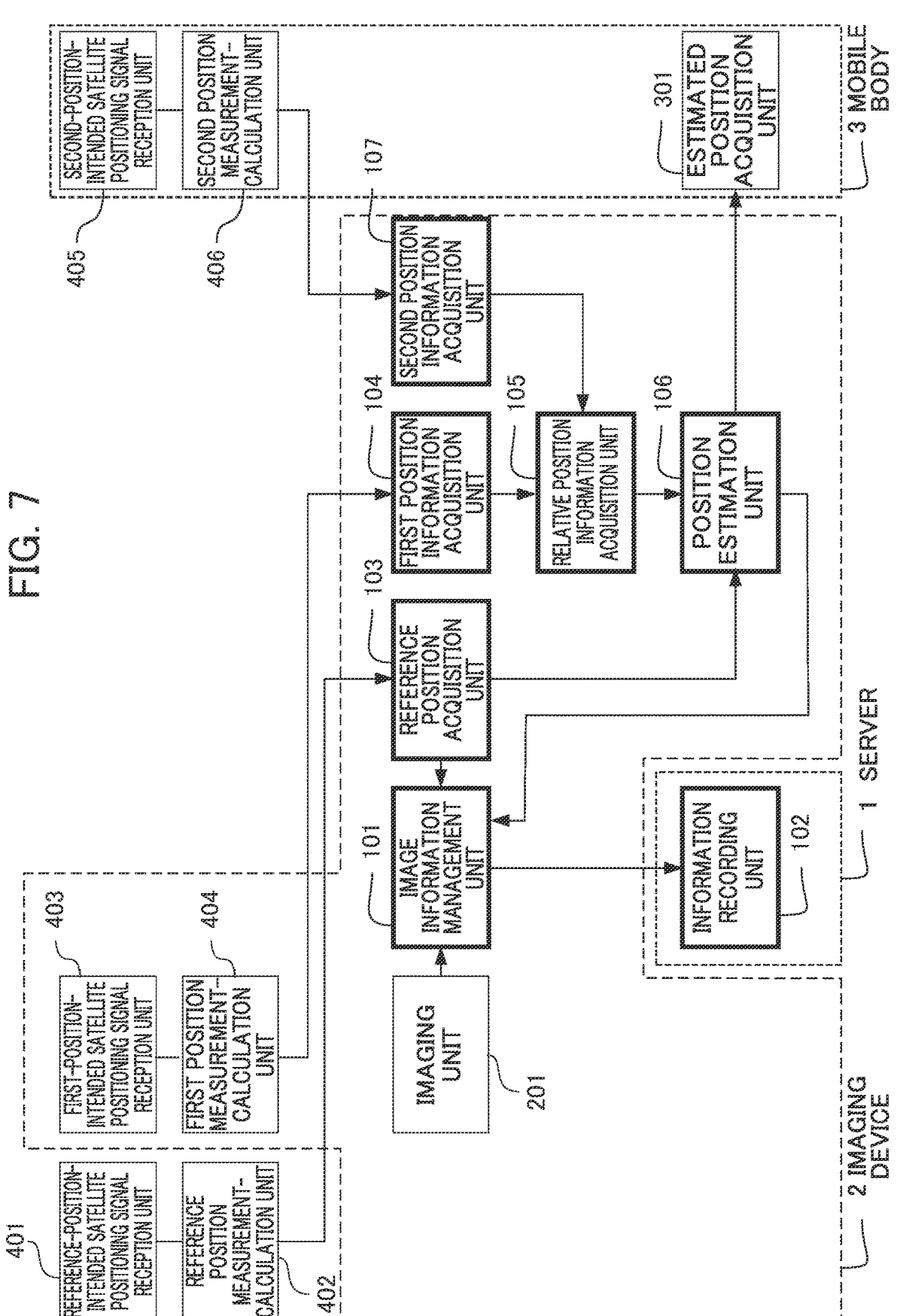
FIG. 7 is a block diagram illustrating functional components of an imaging device, those of a server, and those of a mobile body according to an embodiment of the present invention, and particularly illustrates an example in which information processing functions other than an information recording unit are incorporated in the imaging device.

FIG. 7 illustrates an example in which among the functional components of the information processing device 10, only the information recording unit 102 is incorporated in the server 1 and the rest is incorporated in the imaging device 2. This configuration, in which the information recording unit 102 is provided in the server 1, is advantageous in that an image with addition of position information with an image as illustrated in FIG. 5 can be checked only by operating the server 1, in comparison with a configuration in which the entire information processing device 10 is incorporated in the imaging device 2. As illustrated in FIG. 1, the imaging device 2 includes the imaging device-communication device 29 that externally acquires the second position information 310 via the communication line 121. Thus, the imaging device 2 equipped with an information processing function constitutes a video system.

Figure 8:
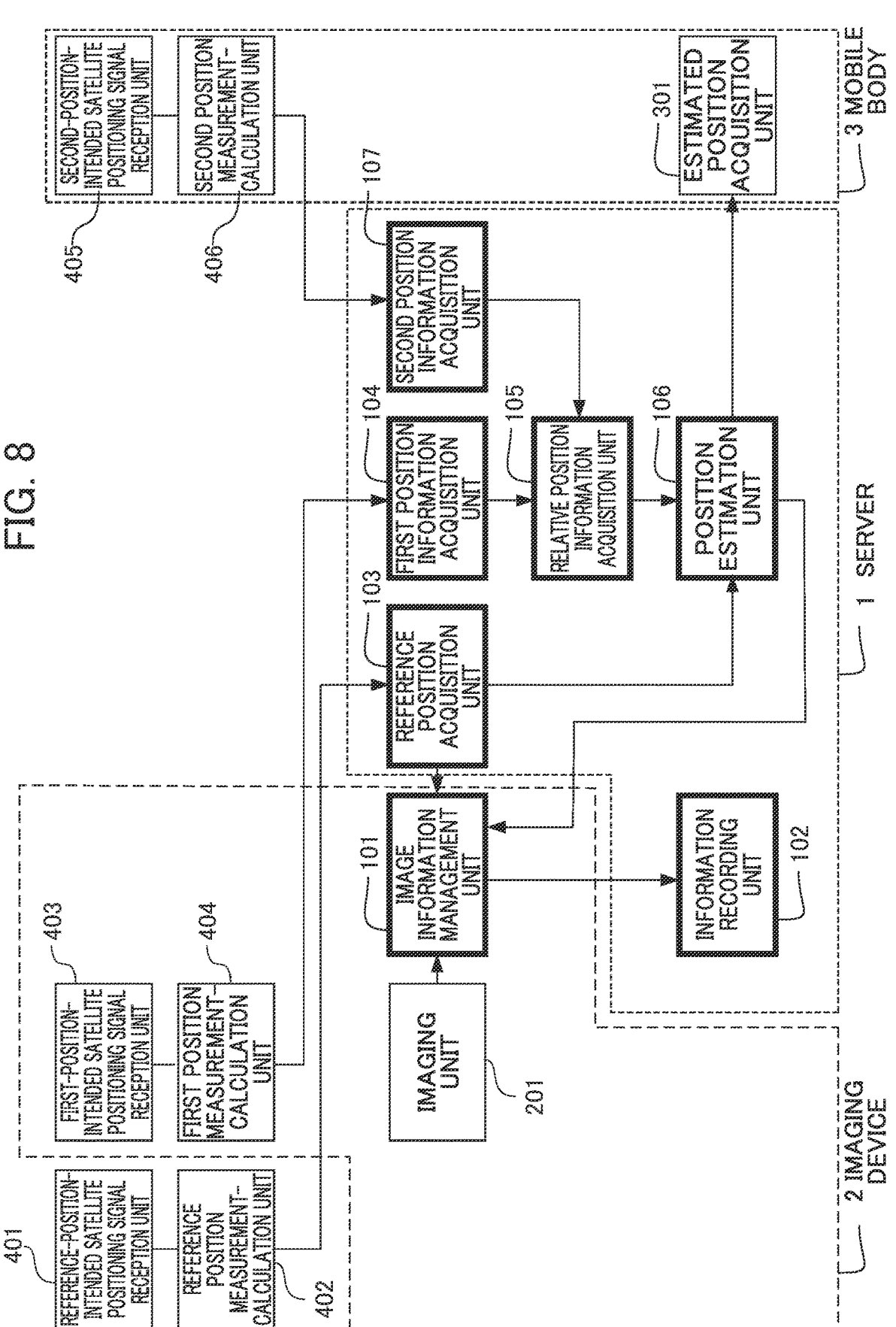
FIG. 8 is a block diagram illustrating functional components of an imaging device, those of a server, and those of a mobile body according to an embodiment of the present invention, and particularly illustrates an example in which an image information management unit is included in the imaging device.

FIG. 8 illustrates an example in which among the functional components of the information processing device 10, the image information management unit 101 is incorporated in the imaging device 2. The imaging device 2 is a device responsible for videos, and typically includes a central processing unit (hereinafter, appropriately referred to as an image engine) specialized for video processing. For example, a video file and an information file including data such as position information and posture information are stored as separate files, and whether or not information pertaining to the information file is to be superimposed on a video is arbitrarily selected at the time of reproduction. When superimposition of information on the video is selected, the image engine is preferably responsible for management of image information, such as processing for adding characters representing the position information to the video and processing for superimposing the video. The configuration advantageously eliminates the need for providing an image engine to the server 1.

Figure 9:
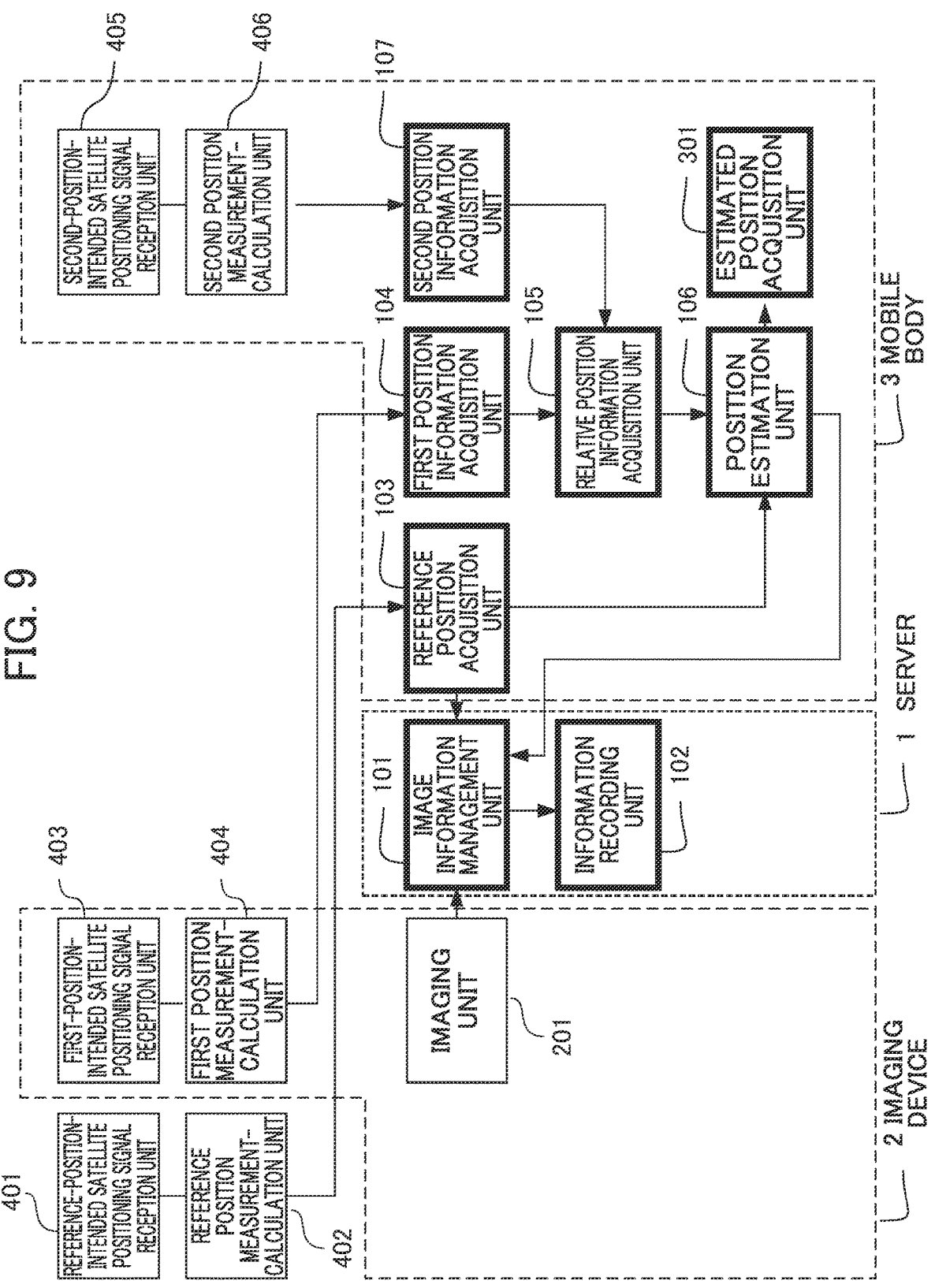
FIG. 9 is a block diagram illustrating functional components of an imaging device, those of a server, and those of a mobile body according to an embodiment of the present invention, and particularly illustrates an example in which an information processing function is incorporated mainly in the mobile body.

FIG. 9 illustrates an example in which the image information management unit 101 and the information recording unit 102 are incorporated in the server 1, and the rest of the functional components of the information processing device 10 are incorporated in the mobile body 3. The mobile body 3 includes the information processing device 10 and acquires the first position information 210 from the imaging device 2 as an external device via the communication line 121. For example, a video file and an information file including data such as position information and posture information are stored as separate files, and whether or not to superimpose the information on a video is arbitrarily selected at the time of reproduction. Since an image engine is necessary for combining images and writing characters to an image, when superimposition of information on the video is selected, a high performance central processing unit (CPU) may be necessary, which may cause a problem of heat generation. The mobile body 3 excluding the image engine advantageously has a simpler structure of mobile body 3 and is lighter in weight, in comparison with a case where all the functional components of the information processing device 10 are incorporated in the mobile body 3.

Figure 10:
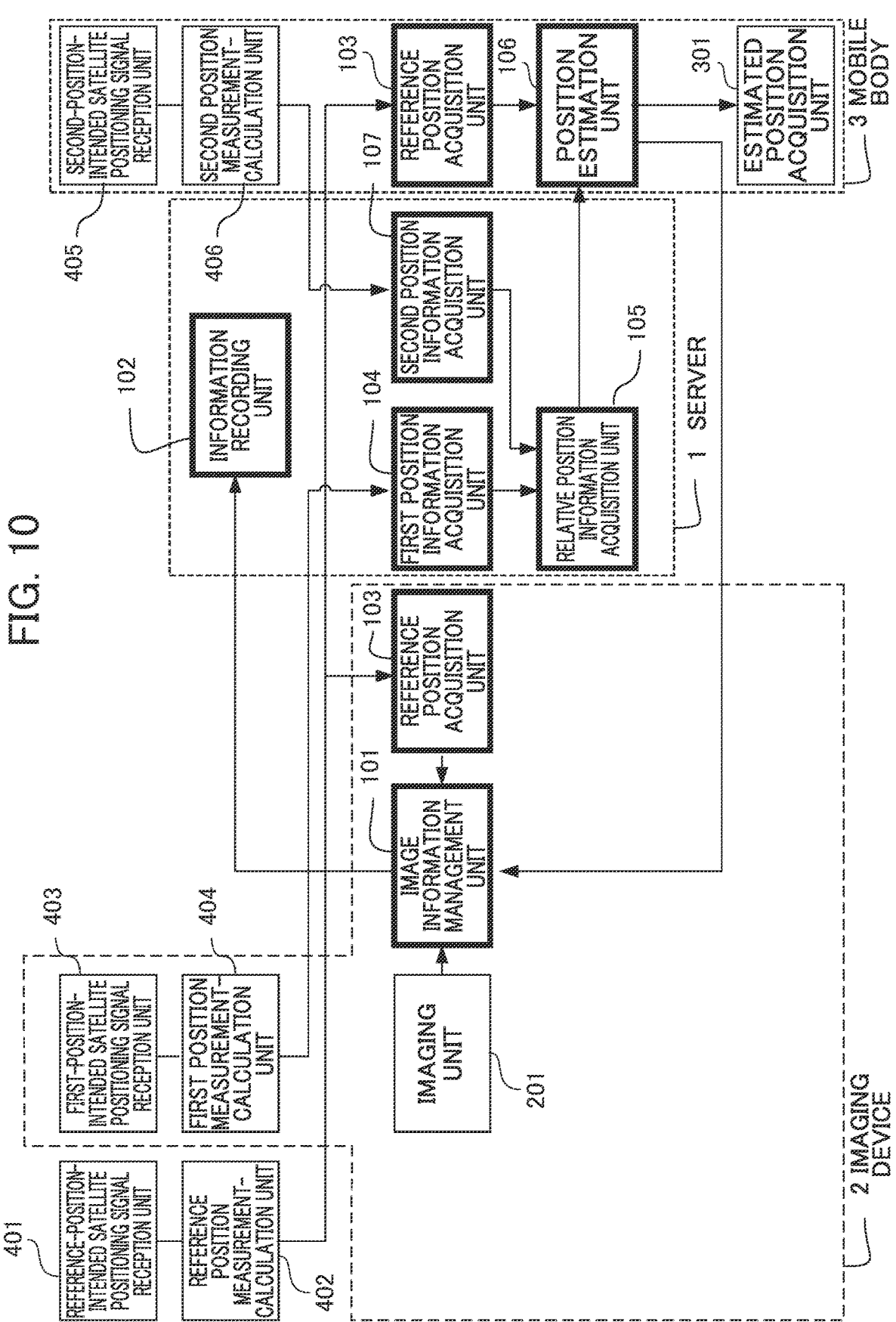
FIG. 10 is a block diagram illustrating functional components of an imaging device, those of a server, and those of a mobile body according to an embodiment of the present invention, and particularly illustrates an example in which an information processing function is divided to be incorporated in the imaging device, the server, and the mobile body.

FIG. 10 illustrates an example in which the position estimation unit 106 is included in the mobile body 3. The mobile body 3 per se calculates its position with accuracy. Since the relative position information acquisition unit 105 is included in the server 1 as an external device, the weight of the mobile body can be reduced. In addition, this configuration allows for an advantageous operation in which the mobile body roughly grasps its position based on a position acquired by the second position measurement-calculation unit 406, and causes the position estimation unit 106 to derive an accurate position of the mobile body as needed.

The series of processing described above can be executed by hardware or software. When the series of processing is executed by software, a program constituting the software is installed in a computer or the like from a network or a recording medium. The recording medium containing such a program may be a removable medium that is distributed separately from a device body in order to provide the program, or a recording medium or the like that is incorporated in advance in the device body and is provided. Examples of the removable medium include a magnetic disk (including a floppy disk), an optical disk, and a magneto-optical disk. Examples of the optical disc include a compact disk-read only memory (CD-ROM), a digital versatile disk (DVD), a Blu-ray (registered trademark) disk, and the like. The magneto-optical disk is, for example, a mini-disk (MD) or the like. Examples of the recording medium that is incorporated in advance in the device body includes a program memory having a program recorded therein, a hard disk, and the like.

The information processing device 10 according to the embodiments described above exert the following effects.

The information processing device 10 includes the reference position acquisition unit 103 configured to acquire the reference position information 200 indicating a position of the imaging device 2, and the position estimation unit 106 configured to acquire the relative position information 230 indicating a positional relationship between the imaging device 2 and the mobile body 3 that moves in a vicinity of the imaging device 2, based on the first position information 210 and the second position information 310, and output the estimated position information 320 indicating a current position of the mobile body 3, based on the relative position information 230 and the reference position information 200, the first position information 210 indicating a current position of the imaging device 2 calculated based on a positioning signal transmitted from a satellite, the second position information 310 indicating a current position of the mobile body 3 based on a positioning signal transmitted from a satellite and synchronized in terms of clock time with the positioning signal on which the first position information 210 is based.

This feature makes it possible to accurately identify the position of the mobile body 3 such as an automobile.

In the information processing device 10, the position estimation unit 106 acquires, as the relative position information 230, a distance indicating a difference between a current position of the imaging device 2 and a current position of the mobile body 3 based on the first position information 210 and the second position information 310, and estimates a current position of the mobile body 3 by adding the relative position information 230 to the reference position information 200.

An error is deleted by taking the difference between pieces of position information having a similar error. As a result, the position of the mobile body 3 can be more accurately identified.

The information processing device 10 includes the image information management unit 101 configured to add the reference position information 200 to an image 240 captured by the imaging device 2.

Due to this feature, in a situation where the imaging device 2 such as a surveillance camera is installed, the position of the mobile body 3 such as an automobile can be accurately identified using the reference position information 200 regarding the imaging device 2.

The information processing device 10 includes the image information management unit 101 configured to add mobile body position information to an image captured by the imaging device 2 and showing the mobile body 3.

Due to this feature, the mobile body 3 and the position thereof can be checked at the same time with reference to the image, making it possible to identify the position of the mobile body 3 without delay.

In the information processing device 10, the reference position acquisition unit 103 acquires, as the reference position information 200, information regarding a position measured by a measurement device detachably connected to the imaging device 2.

The measurement device for providing the reference position information 200 includes a large antenna in many cases. The detachable measurement device is detached after the position is measured, whereby the imaging device 2 is imparted with a space-saving function.

In the information processing device 10, the first position information 210 and the second position information 310 are calculated based on the positioning signals acquired from the same combination of satellites.

In a case where the acquired positioning signals are under the same influence of the external environment, the first position information 210 and the second position information 310 are influenced at the same or similar level, and taking a difference therebetween allows for eliminating the influence. As a result, accuracy of the difference itself improves, and the accurate position of the mobile body 3 can be derived.

An imaging system includes the information processing device 10, a communication device configured to externally acquire the second position information by way of communication, and the imaging device 2.

Since the imaging device 2 incorporates therein the information processing device 10 and can acquire necessary signals, the position of the mobile body 3 can be derived by the imaging device 2 alone, which constitutes a closed system.

The mobile body 3 includes the information processing device 10 and a communication device configured to externally acquire the first position information 210 by way of communication.

The mobile body 3 constitutes a closed system having a computing function, thereby making it possible to prevent a situation in which the communication line 121 becomes poorly connected to the information processing device 10 due to bad weather or the like and the position of the mobile body 3 cannot be identified.

A program includes a reference position acquisition function of acquiring the reference position information 200 indicating a position of the imaging device 2, a first position information acquisition function of acquiring the first position information 210 indicating a current position of the imaging device 2 calculated based on a positioning signal transmitted from a satellite, a second position information acquisition function of acquiring the second position information 310 indicating a current position of the mobile body 3 that moves in the vicinity of the imaging device 2 based on a positioning signal transmitted from a satellite and synchronized in terms of clock time with the positioning signal on which the first position information 210 is based, and a position estimation function of acquiring the relative position information 230 indicating a positional relationship between the imaging device 2 and the mobile body 3 based on the first position information 210 and the second position information 310, and outputting the estimated position information 320 indicating a current position of the mobile body 3 based on the relative position information 230 and the reference position information 200.

This feature makes it possible to accurately identify the position of the mobile body 3 such as an automobile.

A positioning method includes a reference position information acquisition step of acquiring the reference position information 200 indicating a position of the imaging device 2, a first position information acquisition step of acquiring the first position information 210 indicating a current position of the imaging device 2 calculated based on a positioning signal transmitted from a satellite, a second position information acquisition step of acquiring the second position information 310 indicating a current position of the mobile body 3 that moves in the vicinity of the imaging device 2 based on a positioning signal transmitted from a satellite and synchronized in terms of clock time with the positioning signal on which the first position information 210 is based, and a position estimation step of acquiring the relative position information 230 indicating a positional relationship between the imaging device 2 and the mobile body 3 based on the first position information 210 and the second position information 310, and outputting the estimated position information 320 indicating a current position of the mobile body 3 based on the relative position information 230 and the reference position information 200.

This feature makes it possible to accurately identify the position of the mobile body 3 such as an automobile.

It should be noted that the present invention is not limited to the embodiments described above, and may be modified as appropriate. For example, some of the functional components of the above-described embodiments may be omitted, or the functional components may be combined with each other.

REFERENCE NUMERALS

1: Server
2: Imaging device
3: Mobile body
10: Information processing device
11: Input/output unit
12: Communication unit
13: Processor
14: ROM
15: RAM
16: Bus
17: Input/output interface
18: Control unit
20: Reference-position-intended antenna
21: First-position-intended antenna
31: Second-position-intended antenna
41: Reference-position-intended satellite
2: First-position-intended satellite
43: Second-position-intended satellite
101: Image information management unit
103: Reference position acquisition unit
106: Position estimation unit
121: Communication line It is claimed:

1. An information processing device comprising:
a reference position acquisition unit configured to acquire reference position information indicating a position of an imaging device; and
a position estimation unit configured to acquire relative position information indicating a positional relationship between the imaging device and a mobile body that moves in a vicinity of the imaging device, based on first position information and second position information, and output mobile body position information indicating a current position of the mobile body, based on the relative position information and the reference position information, the first position information indicating a current position of the imaging device calculated based on a positioning signal transmitted from a satellite, the second position information indicating a current position of the mobile body based on a positioning signal transmitted from a satellite and synchronized in terms of clock time with the positioning signal on which the first position information is based.

2. The information processing device according to claim 1, wherein
the position estimation unit acquires, as the relative position information, a distance indicating a difference between a current position of the imaging device and a current position of the mobile body based on the first position information and the second position information, and
estimates a current position of the mobile body by adding the relative position information to the reference position information.

3. The information processing device according to claim 1, comprising:
an image information management unit configured to add the reference position information to an image captured by the imaging device.

4. The information processing device according to claim 1, comprising:

an image information management unit configured to add the mobile body position information to an image captured by the imaging device and showing the mobile body.

5. The information processing device according to claim 1, wherein the reference position acquisition unit acquires, as the reference position information, information regarding a position measured by a measurement device detachably connected to the imaging device.

6. The information processing device according to claim 1, wherein the first position information and the second position information are calculated based on positioning signals acquired from a same combination of satellites.

7. An imaging system comprising:

the information processing device according to claim 1;

a communication device configured to externally acquire the second position information by way of communication; and the imaging device.

8. A mobile body comprising:

the information processing device according to claim 1; and a communication device configured to externally acquire the first position information by way of communication.

9. A non-transitory computer readable medium storing a program comprising:

a reference position acquisition function of acquiring reference position information indicating a position of an imaging device;

a first position information acquisition function of acquiring first position information indicating a current position of the imaging device calculated based on a positioning signal transmitted from a satellite;

a second position information acquisition function of acquiring second position information indicating a current position of a mobile body that moves in a vicinity of the imaging device based on a positioning signal transmitted from a satellite and synchronized in terms of clock time with the positioning signal on which the first position information is based; and a position estimation function of acquiring relative position information indicating a positional relationship between the imaging device and the mobile body based on the first position information and the second position information, and outputting mobile body position information indicating a current position of the mobile body based on the relative position information and the reference position information.

10. A positioning method comprising:

a reference position information acquisition step of acquiring reference position information indicating a position of an imaging device;

a first position information acquisition step of acquiring first position information indicating a current position of the imaging device calculated based on a positioning signal transmitted from a satellite, a second position information acquisition step of acquiring second position information indicating a current position of a mobile body that moves in a vicinity of the imaging device based on a positioning signal transmitted from a satellite and synchronized in terms of clock time with the positioning signal on which the first position information is based, and a position estimation step of acquiring relative position information indicating a positional relationship between the imaging device and the mobile body based on the first position information and the second position information, and outputting mobile body position information indicating a current position of the mobile body based on the relative position information and the reference position information.

* * * * *